(12) United States Patent
Yamamoto et al.

(10) Patent No.: US 8,126,463 B2
(45) Date of Patent: Feb. 28, 2012

(54) MOBILE COMMUNICATION SYSTEM, BASE STATION CONTROL APPARATUS, MOBILE TERMINAL AND METHOD FOR CONTROLLING HANDOVER

(75) Inventors: Keiji Yamamoto, Tokyo (JP);
Masakazu Shirakawa, Tokyo (JP);
Kazuya Negishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 625 days.

(21) Appl. No.: 12/199,970

(22) Filed: Aug. 28, 2008

(65) Prior Publication Data

US 2009/0069015 A1  Mar. 12, 2009

(30) Foreign Application Priority Data

Sep. 12, 2007  (JP) ................................ 2007-236602

(51) Int. Cl.
*H04W 88/02* (2009.01)

(52) U.S. Cl. ........................................................ 455/436

(58) Field of Classification Search .......... 455/436–444; 370/252, 331
See application file for complete search history.

(56) References Cited

U.S. PATENT DOCUMENTS

| | | | | |
|---|---|---|---|---|
| 5,649,290 A * | 7/1997 | Wang | ............................. | 370/332 |
| 6,505,043 B1 * | 1/2003 | Aihara | ........................... | 455/436 |
| 6,654,362 B1 * | 11/2003 | Palamara | ....................... | 370/332 |
| 7,664,502 B2 * | 2/2010 | Oikawa | ........................... | 455/443 |
| 2005/0048974 A1 * | 3/2005 | Kim et al. | ...................... | 455/436 |
| 2005/0237932 A1 * | 10/2005 | Liu | ................................ | 370/230 |
| 2005/0272428 A1 * | 12/2005 | Tanabe et al. | ................. | 455/439 |
| 2006/0171328 A1 * | 8/2006 | Ohtani et al. | ................. | 370/252 |
| 2006/0227746 A1 * | 10/2006 | Kim et al. | ...................... | 370/331 |
| 2007/0008931 A1 | 1/2007 | Yamamoto et al. | | |
| 2008/0064408 A1 * | 3/2008 | Lindoff | ......................... | 455/442 |
| 2010/0020764 A1 * | 1/2010 | Yamamoto et al. | ........... | 370/331 |
| 2011/0028151 A1 * | 2/2011 | Wager | ........................... | 455/436 |

FOREIGN PATENT DOCUMENTS

| | | |
|---|---|---|
| EP | 1 229 754 A1 | 8/2002 |
| EP | 1 278 389 A1 | 1/2003 |
| EP | 1 443 787 A1 | 8/2004 |
| EP | 1 653 673 A1 | 5/2006 |
| EP | 1 670 278 A1 | 6/2006 |
| JP | 2002-501684 | 1/2002 |
| JP | 2008-16970 | 1/2008 |
| WO | WO 98/52375 A2 | 11/1998 |

(Continued)

OTHER PUBLICATIONS

Office Action issued Dec. 10, 2010, in Japan Patent Application No. 2008-222706 (with English translation).

(Continued)

*Primary Examiner* — Diane Mizrahi

(74) *Attorney, Agent, or Firm* — Oblon, Spivak, McClelland, Maier & Neustadt, L.L.P.

(57) ABSTRACT

A mobile communication system that is possible to shorten time from a handover request to a handover completion and to perform a high-speed handover is described. The mobile communication system includes a plurality of base stations which is configured to make wireless communication with a mobile terminal through, and a base station control apparatus connected to the base stations. The base station control apparatus includes a handover control section determines a handover base station to be handed over by the mobile terminal from the base stations, and directs the mobile terminal to hand over to the handover base station.

16 Claims, 15 Drawing Sheets

| HANDOVER ORIGIN BASE STATION | FIRST CANDIDATE BASE STATION | | SECOND CANDIDATE BASE STATION | | THIRD CANDIDATE BASE STATION | | FOURTH CANDIDATE BASE STATION | | FIFTH CANDIDATE BASE STATION | | ... |
|---|---|---|---|---|---|---|---|---|---|---|---|
| | SELECTION RATE | | SELECTION RATE | | SELECTION RATE | | SELECTION RATE | | SELECTION RATE | | ... |
| C S 1 | C S 2 | | C S 3 | | C S 4 | | C S 5 | | — | | ... |
| | 4 0% | | 3 3% | | 2 0% | | 7% | | — | | ... |
| C S 2 | C S 3 | | C S 1 | | C S 6 | | C S 5 | | C S 7 | | ... |
| | 4 0% | | 2 5% | | 1 8% | | 1 2% | | 5% | | ... |
| : | : | | : | | : | | : | | : | | ... |
| C S n | C S m | | C S l | | C S k | | — | | — | | ... |
| | 5 0% | | 3 0% | | 2 0% | | — | | — | | ... |

BASE STATION INFORMATION TABLE

FOREIGN PATENT DOCUMENTS

| | | |
|---|---|---|
| WO | WO 98/52375 A3 | 11/1998 |
| WO | WO 01/74110 A1 | 10/2001 |
| WO | WO 02/089514 A1 | 11/2002 |
| WO | WO 03/005759 A1 | 1/2003 |
| WO | WO 2004/046853 | 6/2004 |
| WO | WO 2005/025253 A1 | 3/2005 |

OTHER PUBLICATIONS

Search Report issued Mar. 30, 2011 in European Patent Application No. 08015324.0-2412/2037710.

* cited by examiner

| HANDOVER ORIGIN BASE STATION | FIRST CANDIDATE BASE STATION | SELECTION RATE | SECOND CANDIDATE BASE STATION | SELECTION RATE | THIRD CANDIDATE BASE STATION | SELECTION RATE | FOURTH CANDIDATE BASE STATION | SELECTION RATE | FIFTH CANDIDATE BASE STATION | SELECTION RATE | ... |
|---|---|---|---|---|---|---|---|---|---|---|---|
| CS 1 | CS 2 | 40% | CS 3 | 33% | CS 4 | 20% | CS 5 | 7% | — | — | ... |
| CS 2 | CS 3 | 40% | CS 1 | 25% | CS 6 | 18% | CS 5 | 12% | CS 7 | 5% | ... |
| .. | .. | .. | .. | .. | .. | .. | .. | .. | .. | .. | ... |
| CS n | CS m | 50% | CS l | 30% | CS k | 20% | — | — | — | — | ... |

BASE STATION INFORMATION TABLE

FIG. 4

| HANDOVER ORIGIN BASE STATION | FIRST CANDIDATE BASE STATION | | SECOND CANDIDATE BASE STATION | | THIRD CANDIDATE BASE STATION | | FOURTH CANDIDATE BASE STATION | | FIFTH CANDIDATE BASE STATION | | ... |
|---|---|---|---|---|---|---|---|---|---|---|---|
| | | NUMBER OF TIMES OF SELECTION | | NUMBER OF TIMES OF SELECTION | | NUMBER OF TIMES OF SELECTION | | NUMBER OF TIMES OF SELECTION | | NUMBER OF TIMES OF SELECTION | |
| CS1 | CS2 | 96 | CS3 | 71 | CS4 | 28 | CS5 | 11 | — | — | ... |
| CS2 | CS3 | 115 | CS1 | 62 | CS6 | 54 | CS5 | 27 | CS7 | 12 | ... |
| ... | ... | ... | ... | ... | ... | ... | ... | ... | ... | ... | ... |
| CSn | CSm | 130 | CS1 | 70 | CSk | 45 | — | — | — | — | ... |

BASE STATION INFORMATION TABLE

FIG. 5

MOBILE COMMUNICATION SYSTEM, BASE STATION CONTROL APPARATUS, MOBILE TERMINAL AND METHOD FOR CONTROLLING HANDOVER

CROSS REFERENCE TO RELATED APPLICATION

This application is based upon and claims the benefit of priority from the Japanese Patent Application No. 2007-236602, filed on Sep. 12, 2007, the entire contents of which are incorporated herein by reference.

FIELD OF THE INVENTION

This invention relates to a mobile communication system which has a base station and a base station control apparatus, and more particularly to a mobile communication system that improves handover.

DESCRIPTION OF THE BACKGROUND

A present mobile communication system has a plurality of base stations, and each base station has an area in which the base station can communicate with a mobile terminal. When a certain mobile terminal moves out of the area of the base station which is communicating with the mobile terminal, the mobile terminal changes the base station to other base station which has an area in which the base station can communicate with the mobile terminal. This is called handover or handoff.

In a mobile communication system, such as the PHS (Personal Handy-phone System), since a design for placement of base station is not performed when a base station is placed, a system in which the base station avoids interference autonomously and communicates is adopted. In this system, neither the base station nor a base station control apparatus grasps an absolute position of the mobile terminal because of its property. Therefore, with respect to the handover, the Japanese Laid-Open Patent Application No. Hei 5-14265 describes that a mobile terminal judges communication degradation with movement of the mobile terminal and then sends a connection call to other base station. That is, a mobile terminal initiative handover is adopted. The mobile terminal looks for a surrounding base station, and sends a handover request to other base station based on the search result. It is determined by condition or strength of a radio wave connecting the call between the base station and the mobile terminal, or remaining resources of the base station whether the handover is possible. For this reason, if the mobile terminal can not find the handover base station, the mobile terminal must send a handover request to other base stations repeatedly, and it may take long time from the handover request to a handover completion.

The handover depends greatly on performance of each mobile terminal, such as a receiving sensitivity and a function to look for the handover base station and to require the handover. For this reason, when the radio terminal moves at high-speed, a problem that the handover is overdue and the communication goes out occurs.

SUMMRY OF THE INVENTION

It is an object of the invention to provide a mobile communication system which shortens time from a handover request to a handover completion, and obtains a high-speed handover.

According to an embodiment of the invention, a mobile communication system includes a plurality of base stations configured to make wireless communication with a mobile terminal, and a base station control apparatus connected to the base stations. The base station control apparatus includes a handover control section determines a handover base station to be handed over by the mobile terminal from the base stations, and directs the mobile terminal to hand over to the handover base station.

BRIEF DESCRIPTION OF THE DRAWINGS

FIG. 4 illustrates an example of a base station information table.

FIG. 5 illustrates another example of the base station information table.

DETAILED DESCRIPTION OF THE INVENTION

The accompanying drawings, which are incorporated in and constitute a part of this specification, illustrate several embodiments of the invention and together with the description, serve to explain the principles of the invention. The invention will be explained with reference to the drawings.

Embodiment 1

According to an embodiment of the invention, a mobile communication system includes a plurality of base stations configured to make wireless communication with a mobile terminal, and a base station control apparatus connected to the base stations. The base station control apparatus includes a handover control section determines a handover base station to be handed over by the mobile terminal from the base stations, and directs the mobile terminal to hand over to the handover base station. The mobile terminal is called a personal station in the PHS, and it is also called a mobile station in a cellular phone system. The base station is called a cell station in the PHS.

Figure 1:
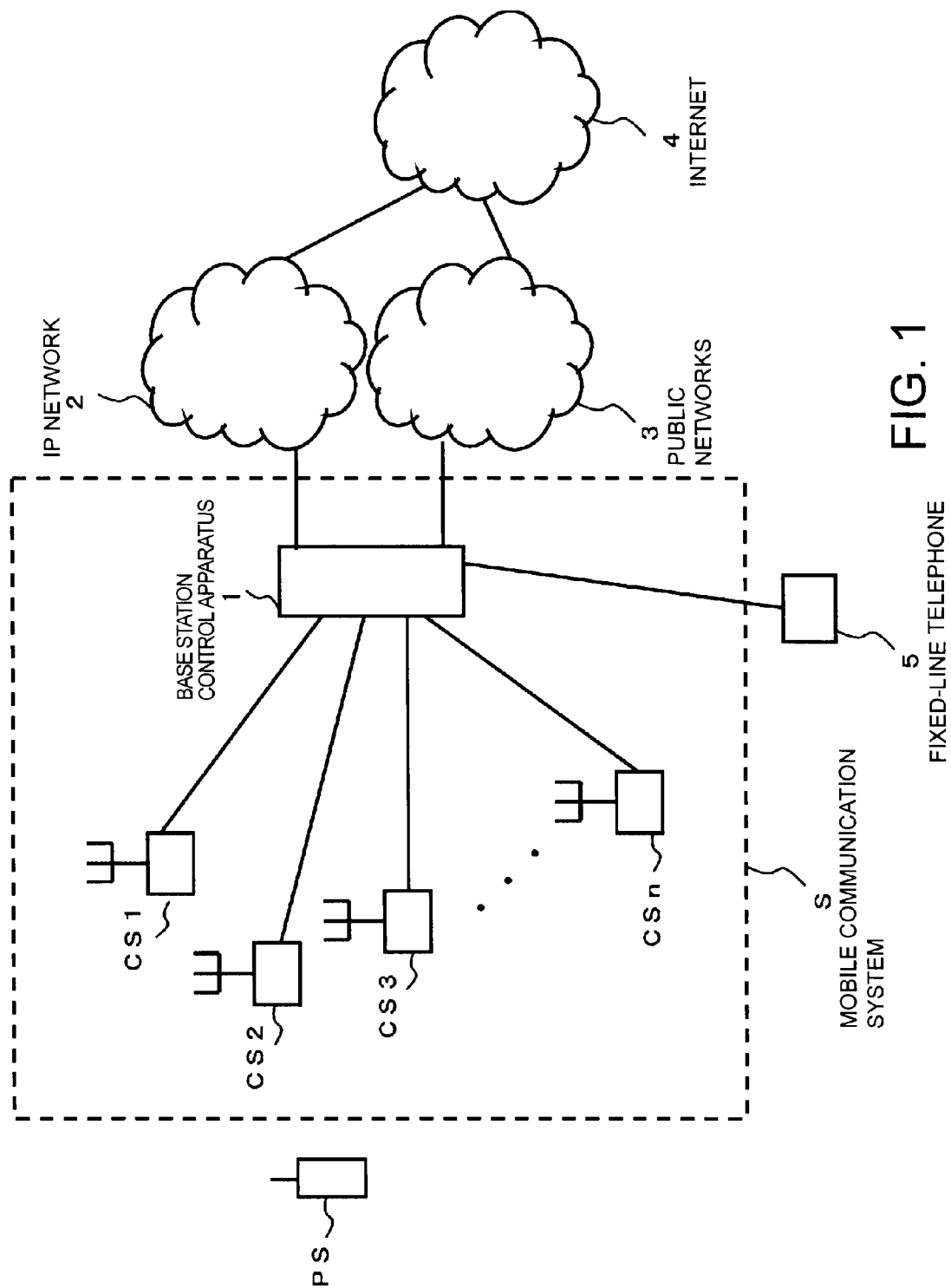
FIG. 1 illustrates a system configuration according to a first embodiment.

FIG. 1 shows a whole mobile communication system according to the first embodiment. Mobile communication system S has base station control apparatus 1 connected to IP network 2 and public network 3, and a plurality of base stations CS1-CSn connected to base station control apparatus 1. Base station control apparatus 1 controls base stations CS1-CSn. Mobile terminal PS connects with base station CS using a radio protocol, and makes communication with other mobile terminals, such as a cellular phone and a PHS terminal, fixed-line telephone 5, and makes connection with Internet 4 through base station control apparatus 1. This mobile terminal PS may be connected to various computers, such as a personal computer and a PDA.

Figure 2:
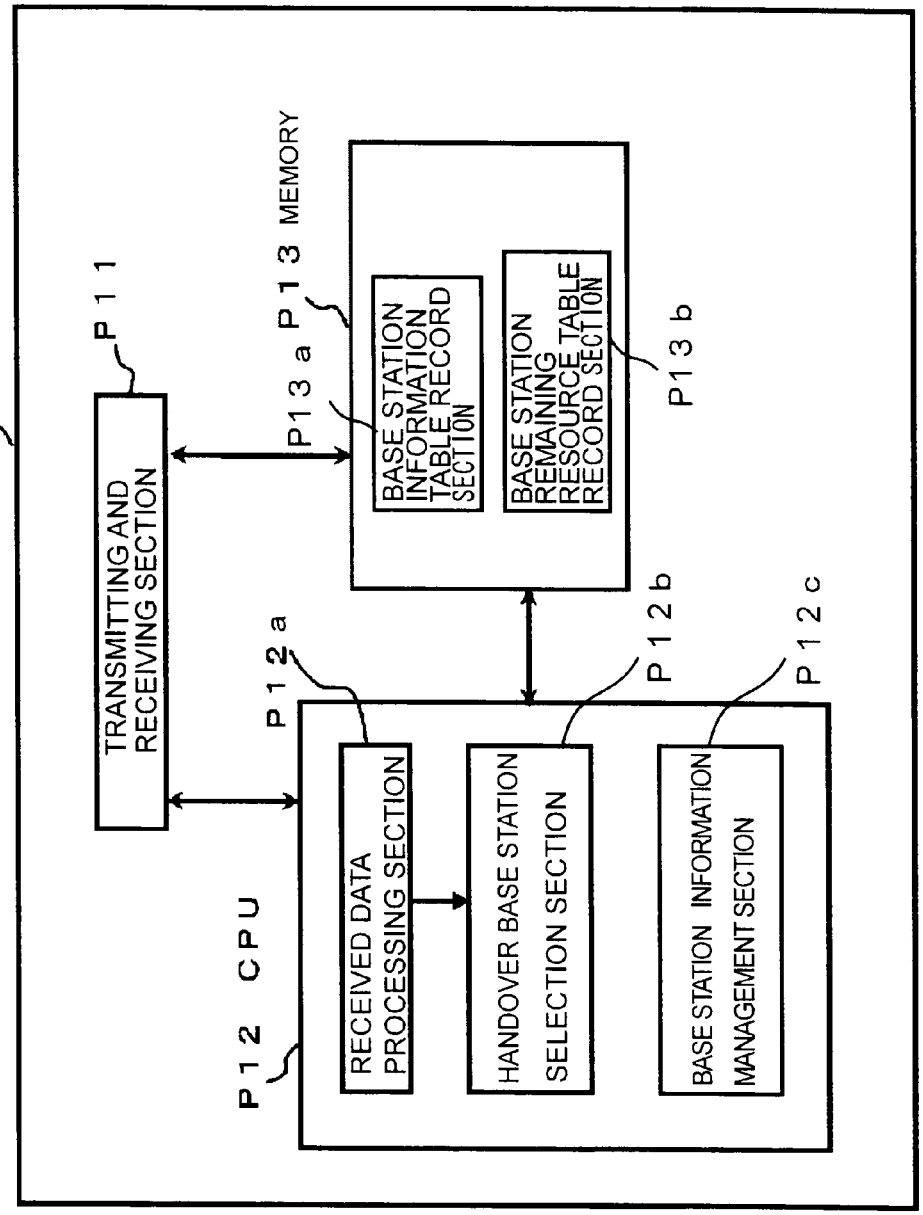
FIG. 2 illustrates a functional block diagram of a base station control apparatus according to the first embodiment.

FIG. 2 is a functional block diagram of the base station control apparatus formed in mobile communication system S. Base station control apparatus 1 has transmitting and receiving section P11, CPU (Central Processing Unit) P12 and memory P13. CPU P12 has receiving data processing section P12a, handover base station selection section P12b and base station information management section P12c. Receiving data processing section P12a processes a received data received with transmitting and receiving section P11, and handover base station selection section P12b selects a handover base station to be handed over by the mobile terminal from the base stations.

Memory P13 has base station information table record section P13a and base station remaining resource table record section P13b. Base station information table record section P13a records base station information table 10 which describes information related to the positional relationship of base stations CS. Base station information table 10 is referred by handover base station selection section P12b when handover base station selection section P12b selects the handover base station to be handed over by the mobile terminal. Base station remaining resource table record section P13b records base station remaining resource table describes remaining radio resources (base station remaining resources) in each base station CS.

When transmitting and receiving section P11 receives data from base station CS, the received data is transferred to receiving data processing section P12a and is processed. If the received data includes the information meaning operation of the handover, handover base station selection section P12b determines the handover base station for mobile terminal PS with reference to base station information table 10 record on base station information table record section P13a.

Figure 3:
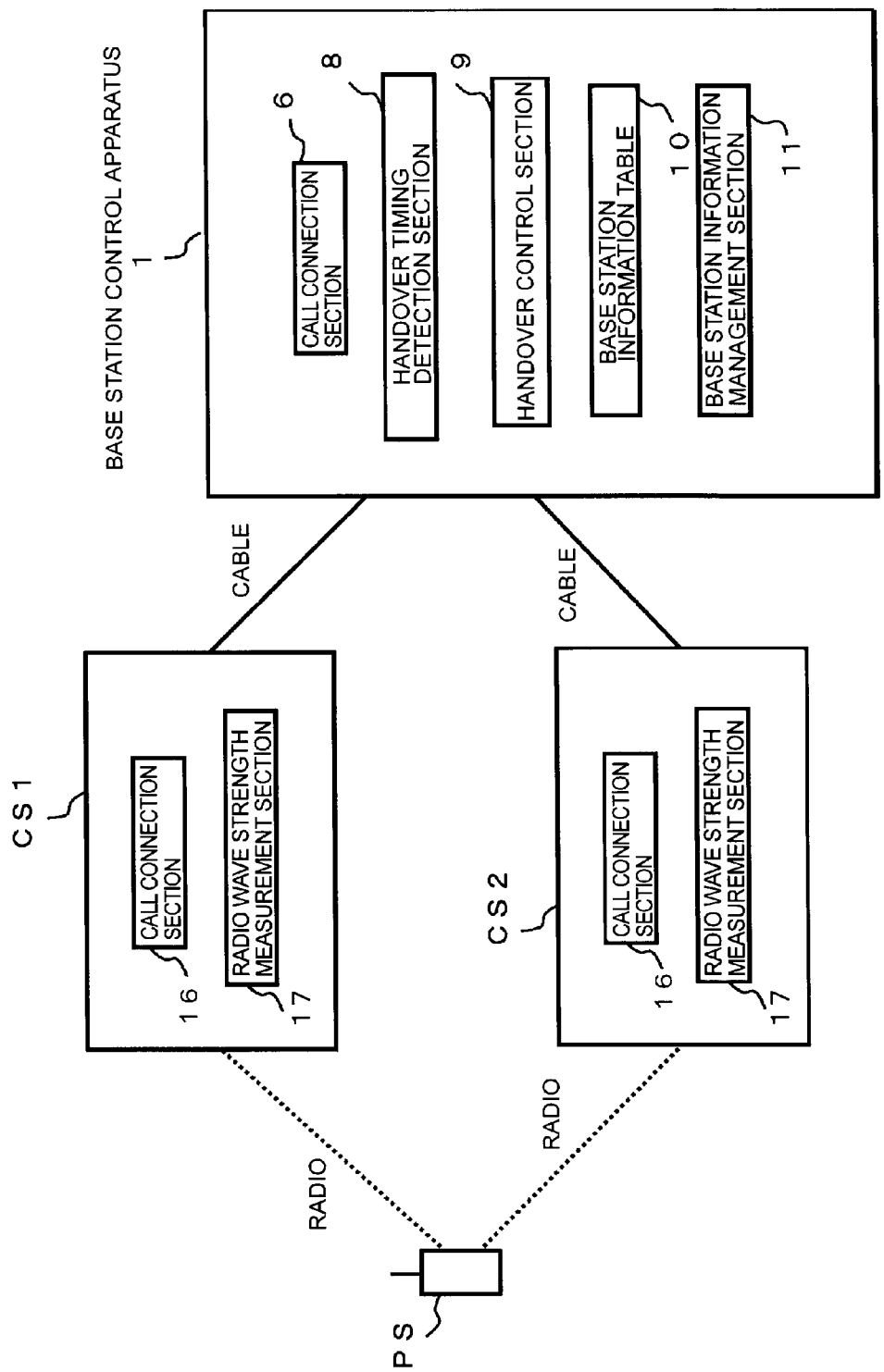
FIG. 3 illustrates a functional block diagram of a system configuration according to the first embodiment.

FIG. 3 shows a system configuration according to the first embodiment. In this embodiment, base station control apparatus 1 detects handover timing.

Base station control apparatus 1 includes call connection section 6 for connecting a call, handover timing detecting section 8 for detecting the handover timing, handover control section 9 for determining the handover base station to be handed over by mobile terminal PS from the base stations and directs mobile terminal PS to hand over, base station information table 10 for storing information on adjacent base stations to the base station, and base station information management section 11. Each base station CS has call connection section 16 for connecting a call and radio wave strength measurement section 17 which measures strength of radio wave from mobile terminal PS. Mobile terminal PS has a call connection section for connecting a call with base station CS and a receiving section which receives a notice of directions from base station control apparatus 1. According to the present invention, radio wave strength measurement section 17 is provided in order to measure communication quality between mobile terminal PS and base station CS, and it works as a communication quality measuring section.

Since, handover timing detection section 8 and handover control section 9 are provided in base station control apparatus 1, the handover of mobile terminal PS is realized by the initiative of base station control apparatus 1. Between base station control apparatus 1 and base station CS, it is connected with a cable. This may be connected by radio. Base station control apparatus 1 according to this embodiment may be constituted using a gateway apparatus. Between mobile terminal PS and base station CS, it is connected by radio.

Base station information table 14 will be explained with reference to FIG. 4 and FIG. 5. On base station information table 10 shown in FIG. 4, base station information is a selection rate of base station CS selected as the handover base station. In a first row, base station CS of handover origin is indicated. After a second row, the base stations selected as the handover base station which mobile terminal PS hands over from base station CS of handover origin and their selection rates are indicated. This base station information is sorted as a handover candidate in order of high selection rate of base station CS.

For example, when the handover origin base station is base station CS1, the base station which is the first candidate of the handover base station is base station CS2. It is shown that the selection rate that base station CS2 was chosen as the handover base station when mobile terminal PS hands over from base station CS1 to other base station CS is 40%. Base station CS3 of which selection rate is 33% is shown as a second candidate. A third candidate is indicated to be base station CS4 of 20% selection rate, and a fourth candidate is indicated to be base station CS5 of 7% selection rate. When the handover origin base stations are base station CS2, . . . , CSn, the handover candidate base stations are also shown with the selection rate like the case where the handover origin base station is base station CS1. This base station information table will be updated whenever the handover is completed.

In base station information table 10 shown in FIG. 5, base station information is a number of times of selection of base station CS selected as the handover base station. In a first row, base station CS of handover origin is indicated. After a second row, the base stations selected as the handover base station when mobile terminal PS hands over from base station CS of the handover origin to other base station CS and their numbers of times of selection are indicated.

For example, when the handover origin base station is base station CS1, the base station which is a first candidate of the handover base station is base station CS2. It is shown that the number of times of selection that base station CS2 was chosen as the handover base station when mobile terminal PS hands over from base station CS1 to other base station CS is 96 times. Base station CS3 of which the number of times of selection is 71 is shown as a second candidate. A third candidate is indicated to be base station CS4 of the 28 times of selection, and a fourth candidate is indicated to be base station CS5 of the 11 times of selection. When the handover origin base stations are base stations CS2, . . . , CSn, the handover candidate base stations are shown with the number of times of selection like the case where the handover origin base station is base station CS1. Like FIG. 4, this base station information table will be updated whenever the handover is completed.

Figures 6, 7:
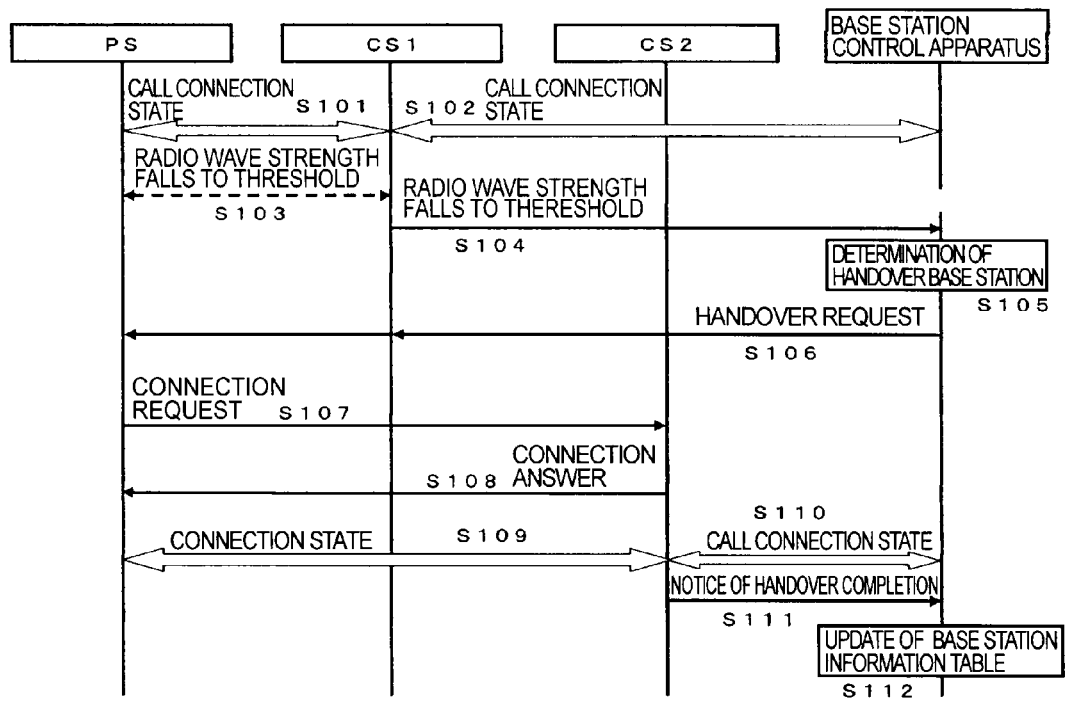
FIG. 6 illustrates an example of a base station remaining resource table.
FIG. 7 illustrates a sequence diagram of handover operation according to the first invention.

FIG. 6 shows an example of the base station remaining resource table memorized in base station remaining resource table record section P13b. Remaining resources are radio resources which base station CS can assign to the mobile terminals. The remaining resources are memorized on the base station remaining resource table for every base station CS which base station control apparatus 1 controls. For example, the remaining resources of base station CS1 are indicated as 30. This shows that there are radio resources which can be assigned to 30 sets of the mobile terminals. And it is shown that base station CS2 has resources for 25 sets of the mobile terminals and base station CS3 has resources for 4 sets of the mobile terminals. About other base station CS, the remaining resources are indicated similarly. The notation of remaining resources is not limited only to the number of the assignable mobile terminal, but the radio resources may be written in units Mbps, for example.

Next, with reference to FIG. 7, processing of the whole mobile communication system S is explained. FIG. 7 is a sequence diagram showing the processing in which base station control apparatus 1 detects the handover timing and determines the handover base station.

While a call between mobile terminal PS and base station CS1 is connected (S101) and a call between base station CS1 and base station control apparatus 1 is connected (S102), respectively, base station CS1 measures the strength of the radio wave from mobile terminal PS which base station CS1 receives. The radio wave strength measured by radio wave strength measurement section 17 is sent to base station control apparatus 1 (S104). Handover timing detecting section 8 provided in base station control apparatus 1 detects the handover timing. Handover timing detecting section 8 judges whether the radio wave strength is less than a predetermined threshold which corresponds to the handover timing. If the radio wave strength is less than the threshold, handover timing detecting section 8 will detect the handover timing. As usage of the threshold, it may be equal to or less than the threshold or may be less than the threshold. Hereinafter, the threshold is used similarly.

If handover timing detecting section 8 detects the handover timing, handover control section 9 will select the first candidate's base station as the handover base station with reference to base station information table 10. That is, handover control section 9 selects the base station with the highest selection rate or the largest number of times of selection as the handover base station. Furthermore, handover control section 9 confirms with reference to the base station remaining resource table that selected base station CS has remaining resources, and handover control section 9 determines handover base station CS (S105).

In this embodiment, base station CS2 with the highest selection rate (or the largest number of times of selection) is selected with reference to base station information table 10 as the handover base station. Furthermore, it is confirmed with reference to the base station remaining resource table that base station CS2 has the remaining resources, and base station CS2 is decided as the handover base station. Here, if base station CS2 has no remaining resources, base station CS3 with next higher selection rate (or next larger number of times of selection) is selected with reference to base station information table 10. And it is also confirmed with reference to the base station remaining resource table that base station CS3 has the remaining resources. And then base station CS3 is decided as the handover base station.

Base station control apparatus 1 requires mobile terminal PS to hand over to base station CS2 via base station CS1 (S106). Mobile terminal PS receives a notice of handover directions which includes information about the base station determined as the handover base station with the receiving section. Then mobile terminal PS sends a connection request to base station CS2 (S107) base on the information contained in the notice of the directions. Base station CS2 which received this connection request sends a connection response to mobile terminal PS (S108), and a call between mobile terminal PS and base station CS2 is connected (109). At this time, a call connection between base station control apparatus 1 and base station CS2 is also established (S110), and base station CS2 sends a notice of handover completion to base station control apparatus 1 (S111).

When base station control apparatus 1 receives the notice of the handover completion, base station information management section 11 updates base station information table 10 (S112). If the base station information about the handover from base station CS1 to base station CS2 is indicated on base station information table 10, numerical value of base station information on base station information table 10 ( selection rate or number of times of selection) is updated, and base station information table 10 will be sorted in numerical high order. Moreover, since the remaining resources of base station CS1 and the remaining resources of base station CS2 change before and after the handover in accordance with this handover, base station information management section 11 update the numerical value of base station remaining resource table.

In addition, in this embodiment, the base station control apparatus 1 takes initiative, and determines the handover base station. However, the handover performed by initiative of mobile terminal PS, which is currently performed by the existing mobile communications system, may be used together. That is, it may be used together that mobile terminal PS sends a handover request to base station CS with the strongest strength of the radio wave which mobile terminal PS receives. In this case, mobile terminal PS may hand over to base station CS which is not indicated on base station information table 10. Thus, when the handover base station is not indicated on base station information table 10, base station information table 10 is updated by adding the base station information about the handover base station to the last of the candidate of base station information table 10.

Figure 8:
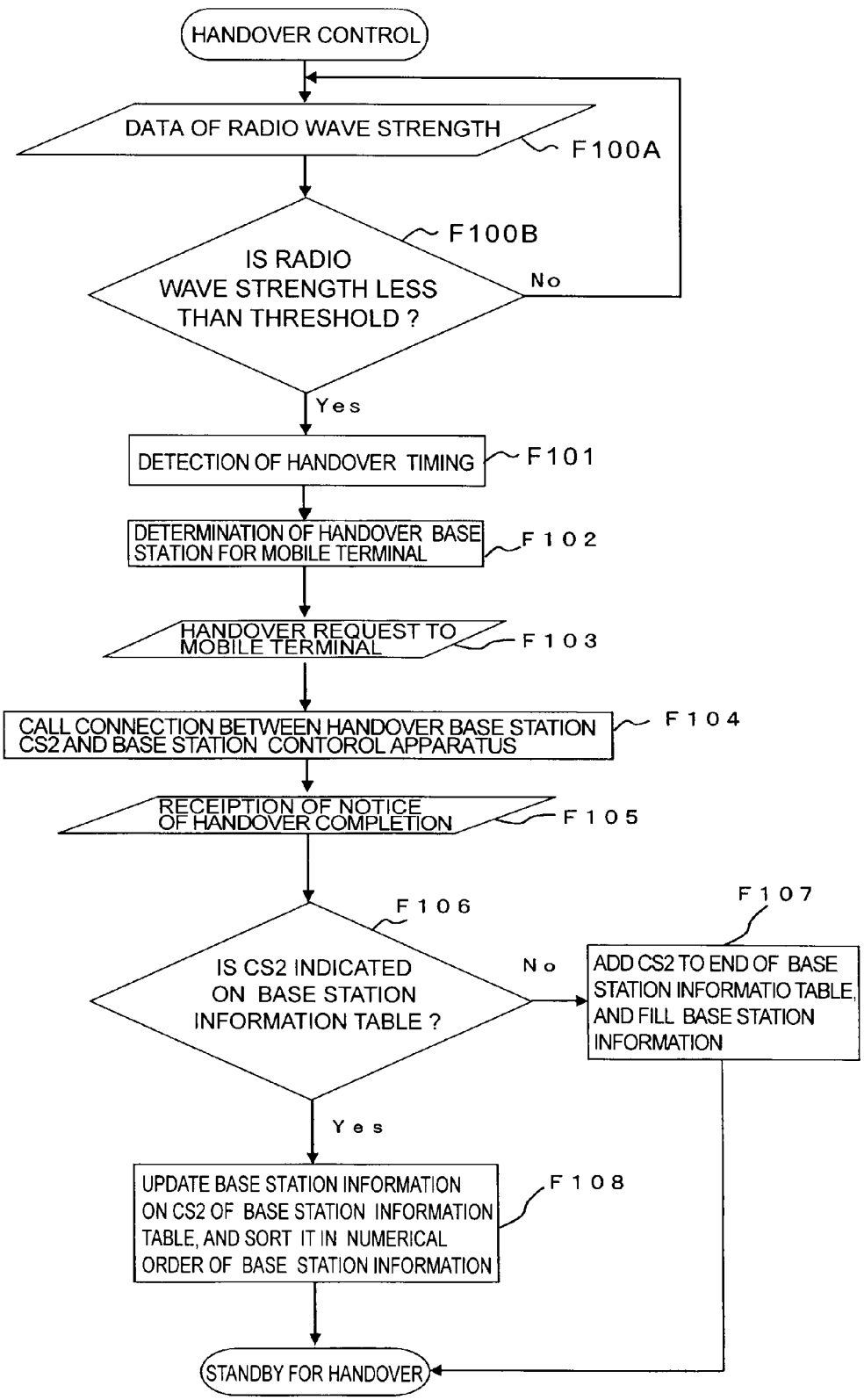
FIG. 8 illustrates a flow chart of the handover operation of the base station control apparatus according to the first embodiment.

FIG. 8 is a flow chart which shows the processing in which base station control apparatus 1 determines the handover base station. Transmitting and receiving section P11 of base station control apparatus 1 receives the data showing the strength of the radio wave of mobile terminal PS of which the radio wave connects the call between mobile terminal PS and base station CS1 (F100A). The data is sent to receiving processing section P12a, and receiving processing section P12a judges whether the radio wave strength is less than the threshold (F100B). If the radio wave strength is less than the threshold, the handover timing will be detected (F101). When the radio wave strength is not less than the threshold, receiving of the data showing the radio wave strength is continued. When the handover timing is detected, handover base station selecting section P12b determines the handover base station for mobile terminal PS with reference to base station information table 10 stored in base station information table record section P13a of memory P13 (F102).

The determination of the handover base station may be made as follows. First, two or more base stations with high selection rate or large number of times of selection are selected using base station information table 10 shown in FIG. 4 or FIG. 5. Next, with reference to the base station remaining resource table, base station CS with most remaining resources is selected among the selected base stations, and the handover base station is determined.

When base station CS is selected as the handover base station for mobile terminal PS (for example, the handover base station is supposed as base station CS2), base station control apparatus 1 requires mobile terminal PS to hand over to base station CS2 via transmitting and receiving section P11 (F103). Then, a process for the call connection between handover base station CS2 and base station control apparatus 1 is performed (F104). If the call between mobile terminal PS and base station CS2 is connected, transmitting and receiving section P11 will receive a notice of the handover completion from base station CS2 (F105).

Base station control apparatus 1 judges whether handover base station CS2 is indicated on base station information table 10 (F106). If indicated, the number of times of selection or the selection rate of applicable base station information (in this embodiment, the information on base station CS2) of base station information table 10 will be updated, and the figure will be sorted in high order (F108). If not indicated, the information on base station CS2 is added to the end of base station information table 10 (F107). The addition of the information on base station CS2 may not be at the end of the table. In that case, after adding the information, the table is sorted in high order of the numerical value of the number of times of selection, or the selection rate. After renewal of base station information table 10, base station control apparatus 1 will be in a state waiting for the handover.

According to the mobile communication system of this embodiment, base station control apparatus 1 determines the handover base station from the base stations, and directs mobile terminal PS to hand over to base station CS determined as the handover base station. Thereby, high-speed handover becomes possible. Furthermore, since handover base station CS is selected and determined from the base station information table which accumulates a history of the handover, the predictive accuracy of the handover base station increases and the success rate of the handover increases.

When base station control apparatus 1 determines the handover base station, base station control apparatus 1 selects base station CS with larger remaining resources with reference to the base station remaining resource table. Thereby, it also becomes possible to prevent traffic increase of base station CS, or to prevent handover incompletion by a shortage of resources. As a result, a success percentage of the handover can be raised.

In the above-mentioned embodiment, in order to measure degradation of the communication quality between base station CS and mobile terminal PS, base station CS measures the strength of the radio wave from mobile terminal PS. However, in the present invention, degradation of the communication quality can be measured by not only the radio wave strength but a bit error rate for example.

Embodiment 2

In embodiment 1, base station CS measures the strength of the radio wave of mobile terminal PS, and sends the measured radio wave strength to base station control apparatus 1. Then, base station control apparatus 1 detects the handover timing, and determines the handover base station.

Figure 9:
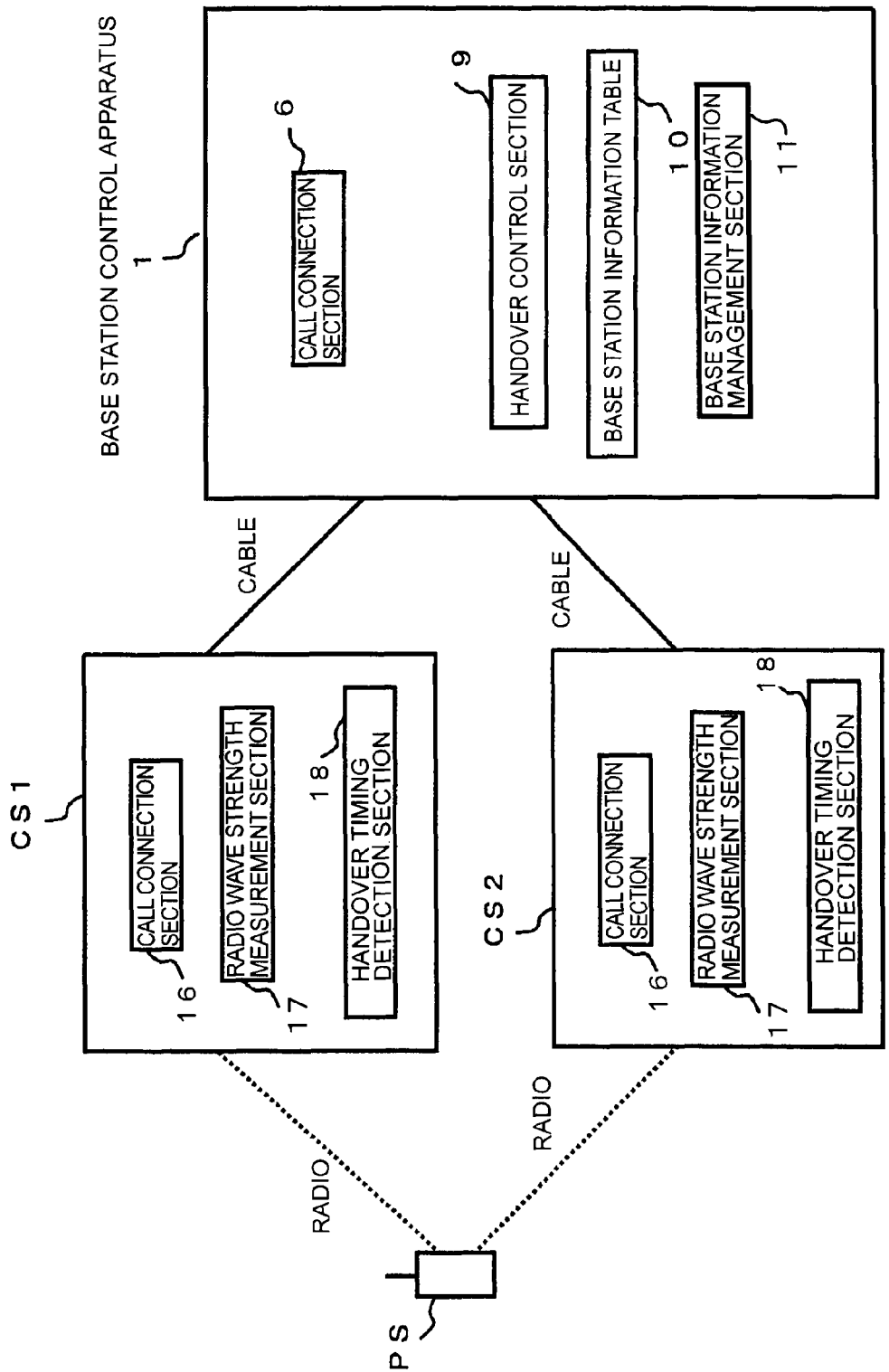
FIG. 9 illustrates a functional block diagram of a system configuration according to a second embodiment.

However, base station CS may detect the handover timing. Therefore, an embodiment in which base station CS measures the strength of the radio wave of mobile terminal PS and detects the handover timing based on the radio wave strength is explained. Whole system drawing of mobile communication system S, a structure of base station control apparatus 1, base station information table 10 and base station remaining resource table are the same as those of embodiment 1. The same numerals denote the same portions and the explanation is omitted. FIG. 9 shows a functional block diagram showing a structure of mobile communication system S according to the second embodiment.

In FIG. 9, base station control apparatus 1 has call connection section 6 for making a call connection, handover control section 9 for determining a handover base station from the base stations and directing a handover, base station information table 10 and base station information management section 11. Base station CS has call connection section 16 for making a call connection, radio wave strength measurement section 17 for measuring strength of a radio wave from mobile terminal PS and handover timing detecting section 18 for detecting handover timing. Mobile terminal PS has a call connection section for connecting a call with base station CS and a receiving section which receives a notice of directions from base station control apparatus 1. The handover of mobile terminal PS is realized by initiative of base station CS. Between base station control apparatus 1 and base station CS, it is connected with a cable. It may be connected by radio. Between mobile terminal PS and base station CS, it is connected by radio. Base station control apparatus 1 can be constituted using a gateway apparatus.

Figure 10:
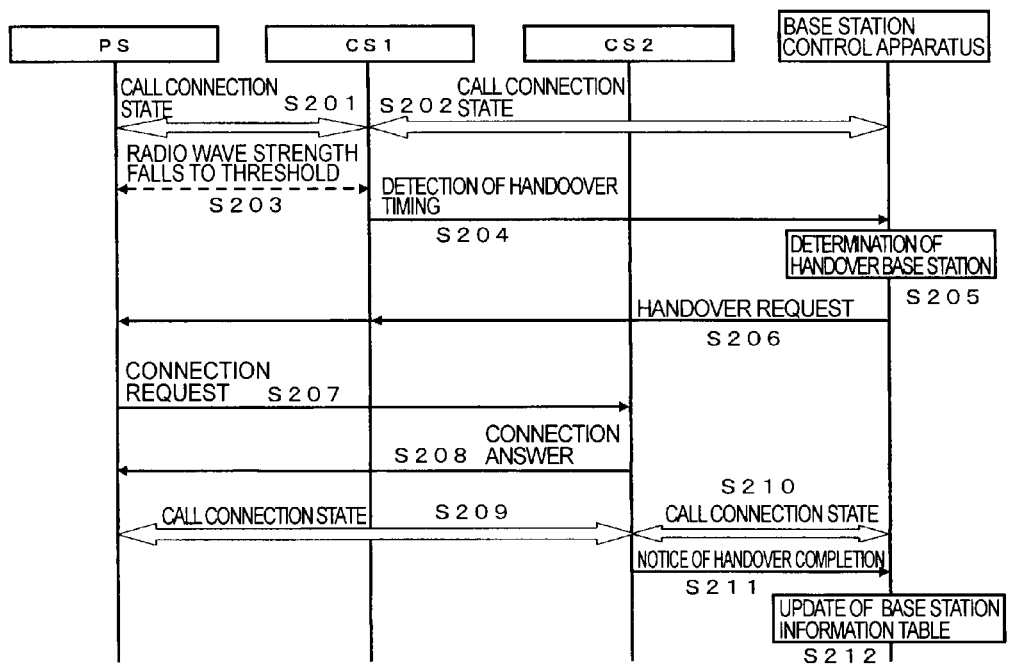
FIG. 10 illustrates a sequence diagram of the handover operation according to the second embodiment.

A sequence of the handover in the system configuration of FIG. 9 will be explained with reference to FIG. 10. When a call between mobile terminal PS and base station CS1 is connected (S201) and a call between base station CS1 and base station control apparatus 1 is connected (S202), radio wave strength measurement section 17 measures the strength of the radio wave of mobile terminal PS which base station CS1 receives. Handover timing detecting section 18 judges whether the radio wave strength measured by radio wave strength measurement section 17 is less than a predetermined threshold. If the radio wave strength is less than the threshold, handover timing detecting section 18 detects the handover timing. When the handover timing is detected, base station CS1 sends data indicating a detection of the handover timing to base station control apparatus 1 (S204). After base station control apparatus 1 receives the data showing the detection of the handover timing, processing from S205 to S212 same as the processing from S105 to S112 is performed.

As mentioned above, base station control apparatus 1 determines the handover base station from the base stations, and directs mobile terminal PS to hand over. Thereby, high-speed handover becomes possible like embodiment 1. And base station control apparatus 1 selects and determines the handover base station from base station information table 10 which accumulates a handover history. Thereby, a predictive accuracy of the handover base station increases and the success rate of the handover increases.

If base station CS with much remaining resources is selected with reference to the base station remaining resources table when base station control apparatus 1 selects and determines the handover base station like embodiment 1, it is also possible to prevent traffic increase of base station CS, or to prevent handover incompletion by a shortage of resources. As a result, the success rate of the handover can be raised.

Embodiment 3

In the mobile communication system according to the second embodiment, base station CS measures the strength of the radio wave of mobile terminal PS, and detects the handover timing based on the radio wave strength.

However, mobile terminal PS may detect the handover timing. Therefore, in this embodiment, mobile terminal PS measure the strength of the radio wave of base station apparatus CS, detects the handover timing based on the strength of the radio wave, and sends having detected the handover timing to base station control apparatus 1 through base station CS.

Figure 11:
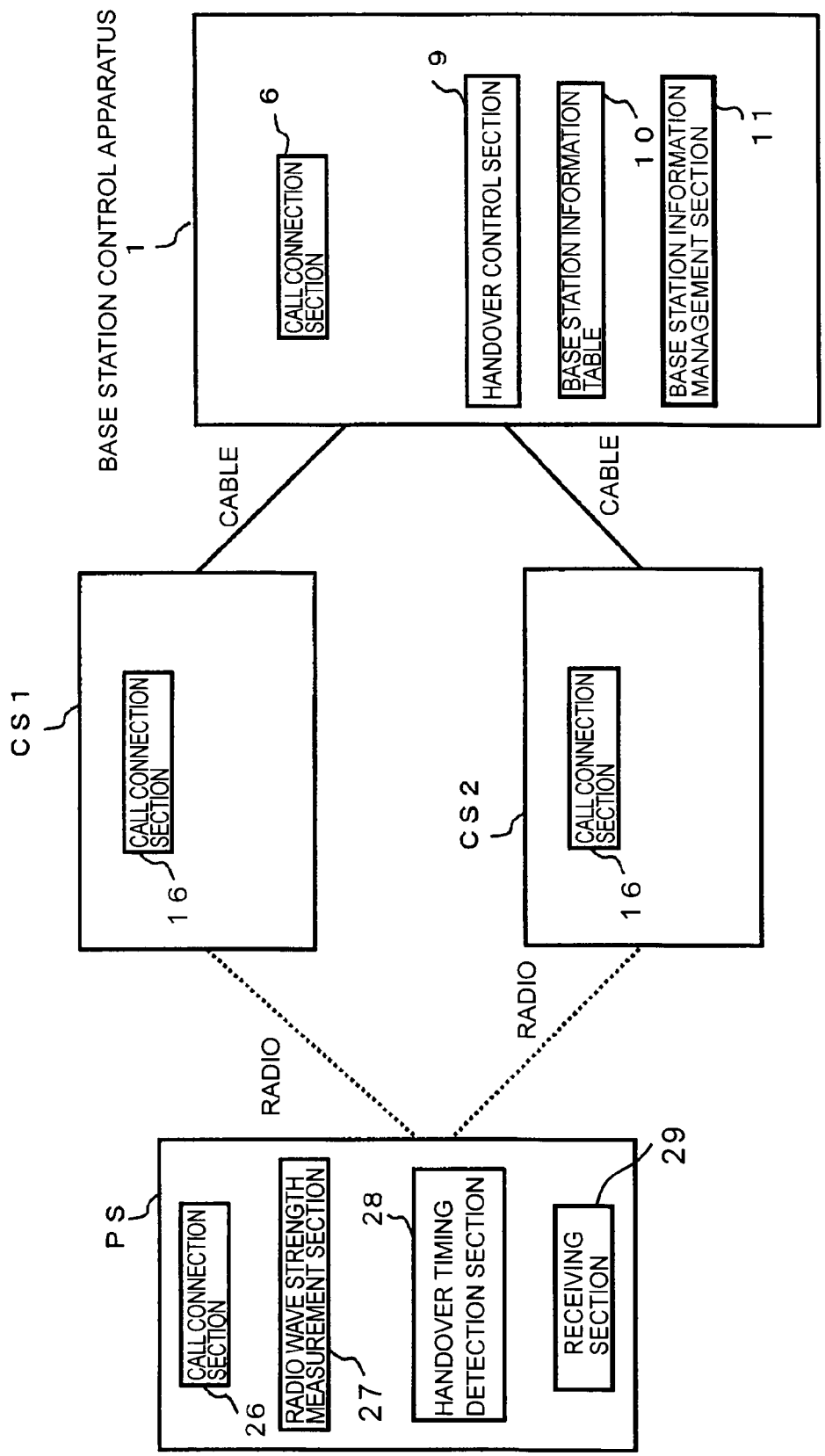
FIG. 11 illustrates a functional block diagram of a system configuration according to a third embodiment.

Whole system drawing of mobile communication system S, a structure of base station control apparatus 1, base station information table 10, and base station remaining resource table are the same as those of embodiment 1. The same numerals are given to the same portions and explanation is omitted. FIG. 11 shows the functional block diagram of mobile communication system S according to the embodiment 3.

In FIG. 11, mobile terminal PS has call connection section 26 for connecting a call, radio wave strength measurement section 27 for measuring the strength of the radio wave of base station CS, handover timing detecting section 28 for judging a handover timing, and receiving section 29 for receiving a notice of directions from base station control apparatus 1. Base station control apparatus 1 has call connection section 6 for connecting a call, handover control section 9 for selecting a handover base station and directing a handover, base station information table 10 and base station information management section 11. Base station CS has call connection section 16 for connecting a call.

By initiative of mobile terminal PS, mobile terminal PS detects the handover timing, and base station control apparatus 1 determines the handover base station from the base stations and directs mobile terminal PS to hand over to the determined base station. And thereby the handover is performed. Between base station control apparatus 1 and base station CS, it is connected with a cable. This connection may be connected by radio. Between mobile terminal PS and base station CS, it is connected with radio. Base station control apparatus 1 of this embodiment can be constituted by a gateway apparatus.

Figure 12:
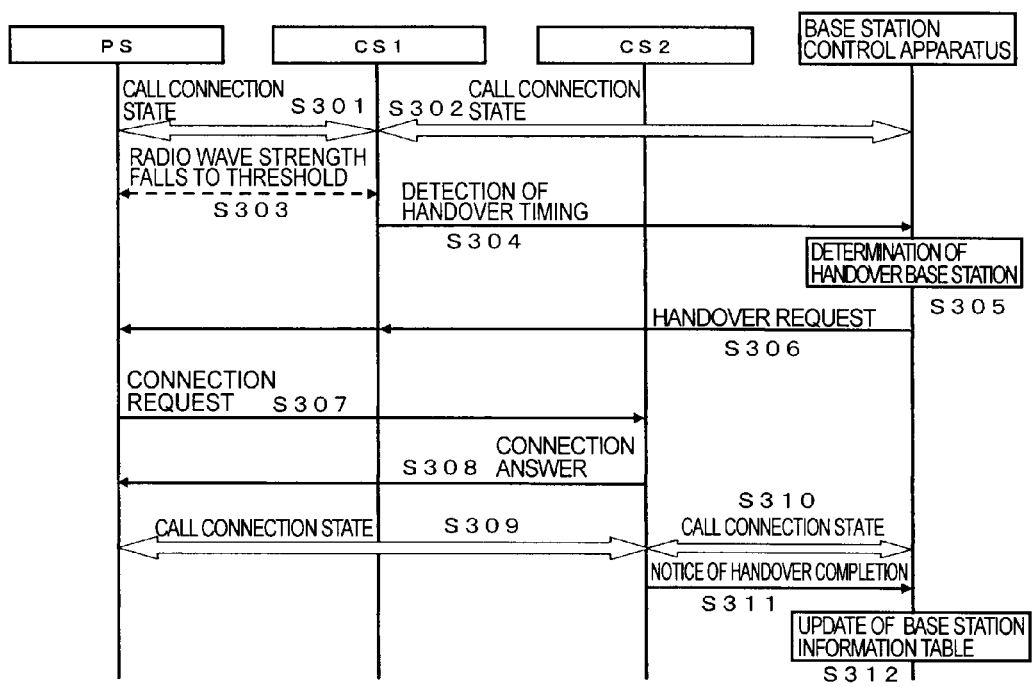
FIG. 12 illustrates a sequence diagram of the handover operation according to the third modification.

A sequence of the handover according to the system configuration of FIG. 11 will be explained with reference to FIG. 12. While a call between base station CS1 and mobile terminal PS is connected (S301) and a call between base station CS1 and the base station control apparatus is connected (S302), radio wave strength measurement section 27 of mobile terminal PS measures the strength of the radio wave of base station CS which by mobile terminal PS receives. Handover timing detecting section 28 judges whether the radio wave strength measured by radio wave strength measurement section 27 is less than a predetermined threshold. If the radio wave strength is less than the threshold, handover timing detecting section 28 detects the handover timing. If the handover timing is detected, mobile terminal PS sends data indicating that the handover timing was detected to base station control apparatus 1 (S304). After base station control apparatus 1 receives the data showing the detection of the handover timing, processing from S305 to S312 same as the processing from S105 to S112 is performed.

As mentioned above, even if mobile terminal PS detects the handover timing, base station control apparatus 1 selects and determines the handover base station, and directs mobile terminal PS to hand over to determined base station CS. Thereby, high-speed handover can be realized, like the first embodiment.

Embodiment 4

In the mobile communication system according to embodiment 1, base station CS measures the strength of the radio wave of mobile terminal PS, and sends the measured radio wave strength to base station control apparatus 1. And when the radio wave strength falls rather than the strength which the handover is performed, base station control apparatus 1 detects the handover timing and determines the handover base station.

However, since the handover base station is determined after detecting the handover timing, a handover processing takes time. Therefore, in the mobile communication system according to the fourth embodiment, base station control apparatus 1 prepares for the handover, when the radio wave strength falls to the strength which is a little higher than the strength at which the handover is operated.

The whole system drawing of mobile communication system S, the structure of base station control apparatus 1, base station information table 10, and base station remaining resource table are the same as those of the embodiment 2. The same numerals are given to the same portions and explanation is omitted.

Figure 13:
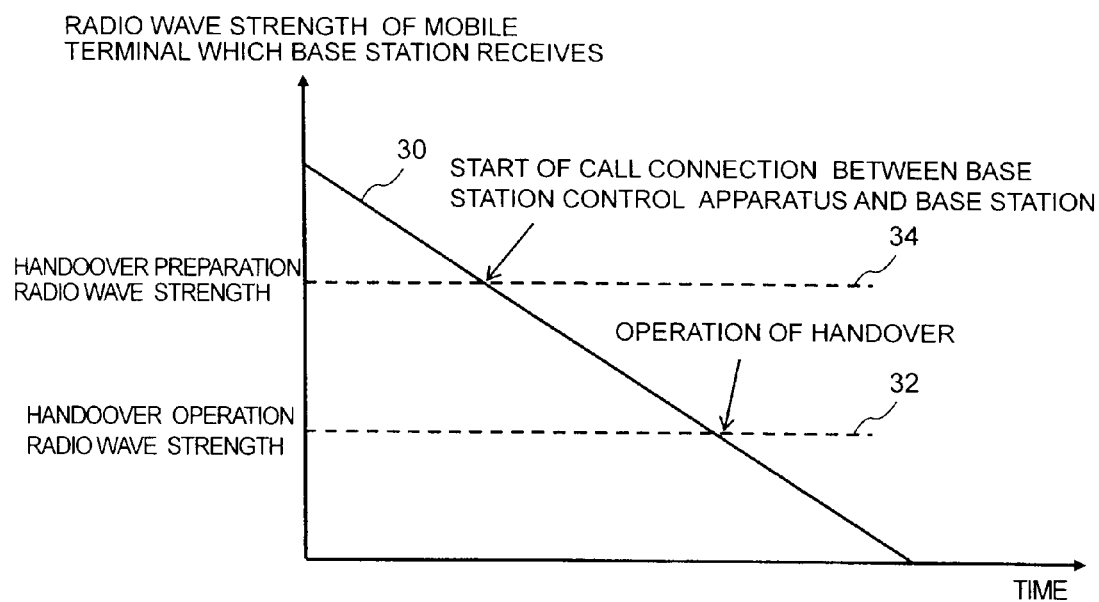
FIG. 13 illustrates a relationship between strength of a radio wave of a mobile terminal received by a base station and the handover operation according to a fourth embodiment.

The relationship between the strength of the radio wave of mobile terminal PS received by base station CS and the handover is shown in FIG. 13. A vertical axis shows the strength of the radio wave from mobile terminal PS which is received by base station CS, and a horizontal axis shows time. While mobile terminal PS moves away from base station CS, the strength of the radio wave of mobile terminal PS which base station CS receives ails as line 30 shown in FIG. 13.

According to this embodiment, two steps of thresholds are provided according to the level of degradation of communication quality, such as the radio wave strength. First threshold 32 is the strength at which the handover is required. Second threshold 34 is the strength which is a little stronger than first threshold 32, and is the strength at which the handover is prepared.

If the radio wave strength falls to the strength (second threshold 34) which is a little higher than the strength at which the handover is performed, base station CS will detect handover preparation timing. If the strength of the radio wave from mobile terminal PS which base station CS receives falls to the strength (first threshold 32) which needs to hand over, base station CS will detects the handover timing. When base station CS detects the handover preparation timing, base station control apparatus 1 selects the handover base station and begins to connect a call between the handover base station and base station control apparatus 1.

Figure 14:
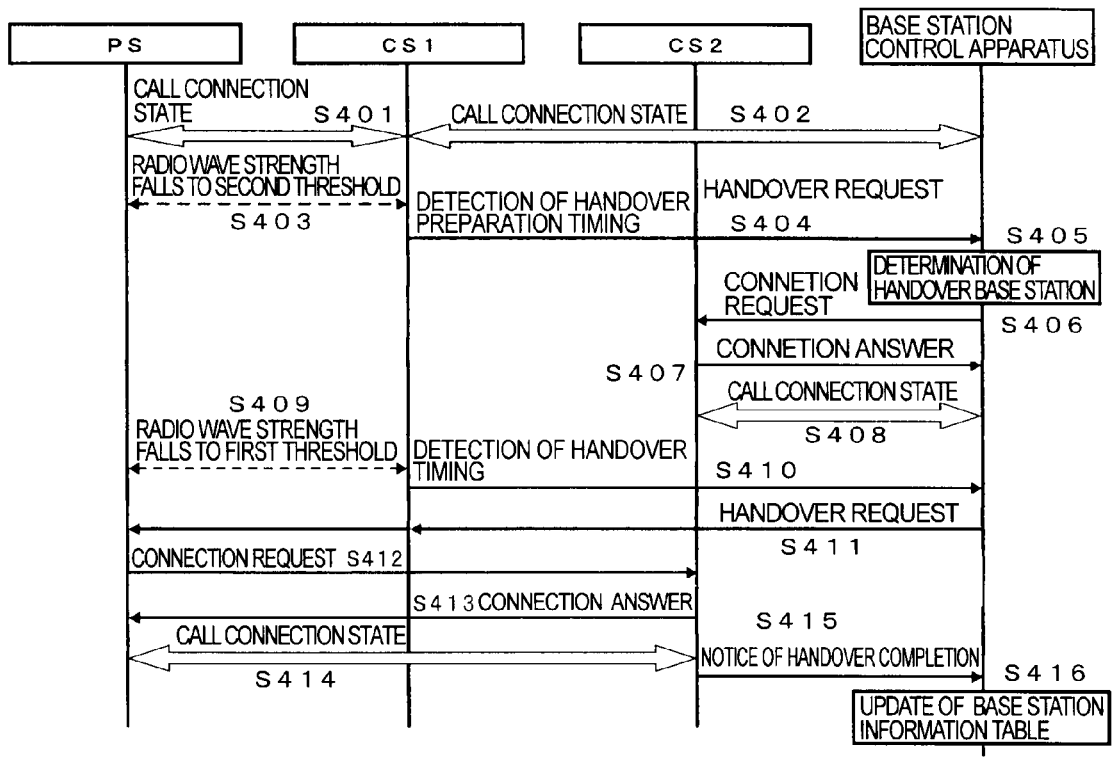
FIG. 14 illustrates a sequence diagram of the handover operation according to the fourth embodiment.

Next, with reference to FIGS. 13 and 14, the sequence of the handover including the call connection of base station control apparatus 1 and handover base station CS2 is explained. FIG. 14 shows the case where base station control apparatus 1 detects the handover preparation timing and the handover timing.

While a call between mobile terminal PS and base station CS1 is connected (S401) and a call between base station CS1 and base station control apparatus 1 is connected (S402), radio wave strength measurement section 17 provided in base station CS1 measures the strength of the radio wave from mobile terminal PS. If the strength of the radio wave is less than the second threshold 34, base station CS1 detects the handover preparation timing by handover timing detecting section 18. And base station CS1 sends a notice of having detected the handover preparation timing to base station control apparatus 1 (S404). When base station control apparatus 1 receives the notice, base station control apparatus 1 selects and determines handover base station CS (S405) with reference to base station information table 10. In this embodiment, the handover base station is supposed base station CS2.

Base station control apparatus 1 sends a request which makes a call connection between selected handover base station CS2 and base station control apparatus 1 start to base station CS2 (S406). Base station CS2 sends a notice of having accepted the request to base station control apparatus 1 (S407), and a call between base station CS2 and base station control apparatus 1 is connected (S408).

If the radio wave strength of mobile terminal PS which is received by base station CS1 is less than first threshold 32, handover detecting section 18 detects the handover timing. Then, base station CS1 sends a notice of having detected the handover timing to base station control apparatus 1 (S410). When base station control apparatus 1 receives the notice of having detected the handover timing (S410), handover control section 9 requires mobile terminal PS to hand over to base station CS2 (S411). Mobile terminal PS receives a notice of handover directions which includes information about the handover base station with receiving section 29. Mobile terminal PS which is requested the handover sends a connection request to base station CS2 which is identified by the notice of the handover directions (S412). Base station CS2 which received the connection request sends a connection answer to mobile terminal PS (S413) and a call between mobile terminal PS and base station CS2 is connected. Then, base station CS2 sends a notice of the handover completion to base station control apparatus 1 (S415).

A method for determining the handover base station is the same as that of first to third embodiments. When base station control apparatus 1 receives the notice of the handover completion, the base station information table is updated like first to third embodiments (S416).

Figure 15:
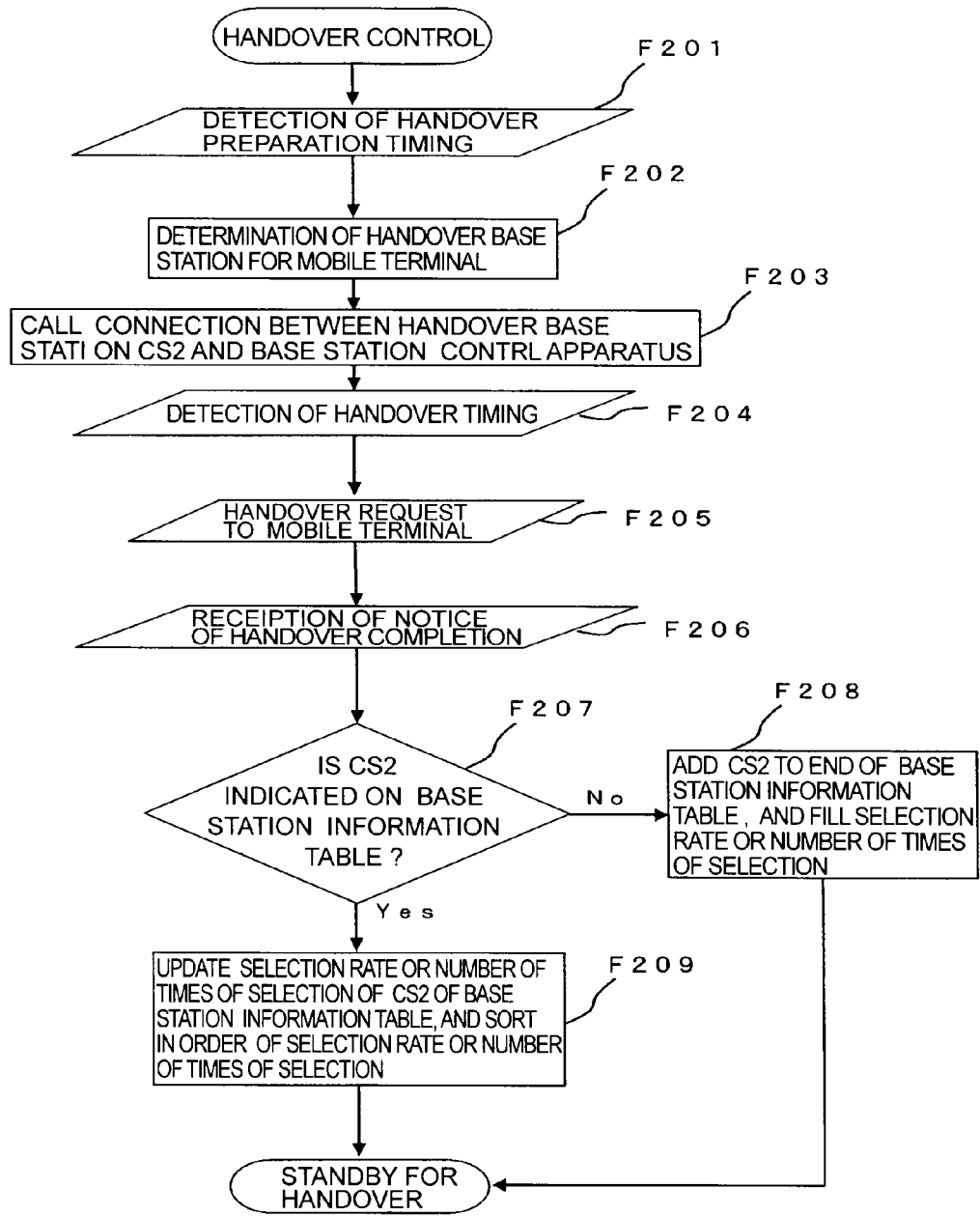
FIG. 15 illustrates a flow chart of the handover operation of a base station control apparatus according to the fourth embodiment.

FIG. 15 is a flow chart which shows a processing in which base station control apparatus determines the handover base station. In the system shown in FIG. 9, if the strength of the radio wave of mobile terminal PS which makes a call connection between mobile terminal PS and base station CS1 becomes less than second threshold 34, handover timing detecting section 18 of base station CS1 will detect the handover preparation timing. And base station CS1 sends the data showing having detected the handover preparation timing to base station control apparatus 1. If the data showing that the handover timing was detected is received by transmitting and receiving section P11 of base station control apparatus 1 (F201), the data will be transferred to receiving data processing part P12a. Handover base station selection section P12b determines the handover base station for mobile terminal PS with reference to base station information table 10 recorded on memory P13 (F202). For example, supposing base station CS2 is selected as the handover base station, a call between base station CS2 and base station control apparatus 1 will be connected (F203).

After that, if the strength of the radio wave from mobile terminal PS which base station CS1 receives becomes less than the first threshold and handover detecting section 18 detects the handover timing, base station CS1 will send the data showing the detection of the handover timing to base station control apparatus 1. When base station control apparatus 1 receives the data showing the detection of the handover timing (F204), base station control apparatus 1 requires mobile terminal PS to hand over to base station CS2 via transmitting and receiving section P11 (F205).

If base station control apparatus 1 receives the handover completion from base station CS2 via transmitting and receiving section P11 (F206), base station control apparatus 1 judges whether the base station information on base station CS2 is indicated on base station information table 10 (F207). Subsequent procedures are the same in the procedure after processing F108 shown in FIG. 8 explained in the first embodiment.

As mentioned above, according to the mobile communication system of this embodiment, since base station control apparatus 1 determines the handover base station with reference to the base station information table, a high-speed handover becomes possible. Furthermore, since the handover preparation is prepared, the call connection between base station control apparatus 1 and handover base station CS2 has been established beforehand when handover operation is made. For this reason, as compared with the conventional technology and the systems according to the embodiments 1 to 3, the handover is realizable with less procedures from the handover request to the handover completion.

In the above-mentioned explanation, base station CS detects the handover preparation timing and detects the handover timing in the system configuration shown in FIG. 9. And base station CS sends the data showing that the handover preparation timing was detected and the data showing that the handover timing was detected to base station control apparatus 1. However, this invention is not restricted to this. In the system configuration shown in FIG. 3, base station CS may send the data in which the strength of the radio wave from mobile terminal PS is shown to base station control apparatus 1, and base station control apparatus 1 may detects both the handover preparation timing detection and the handover timing detection.

Embodiment 5

Embodiment 4 shows the case that base station CS or base station control apparatus 1 detects both the handover timing and the handover preparation timing.

Figure 16:
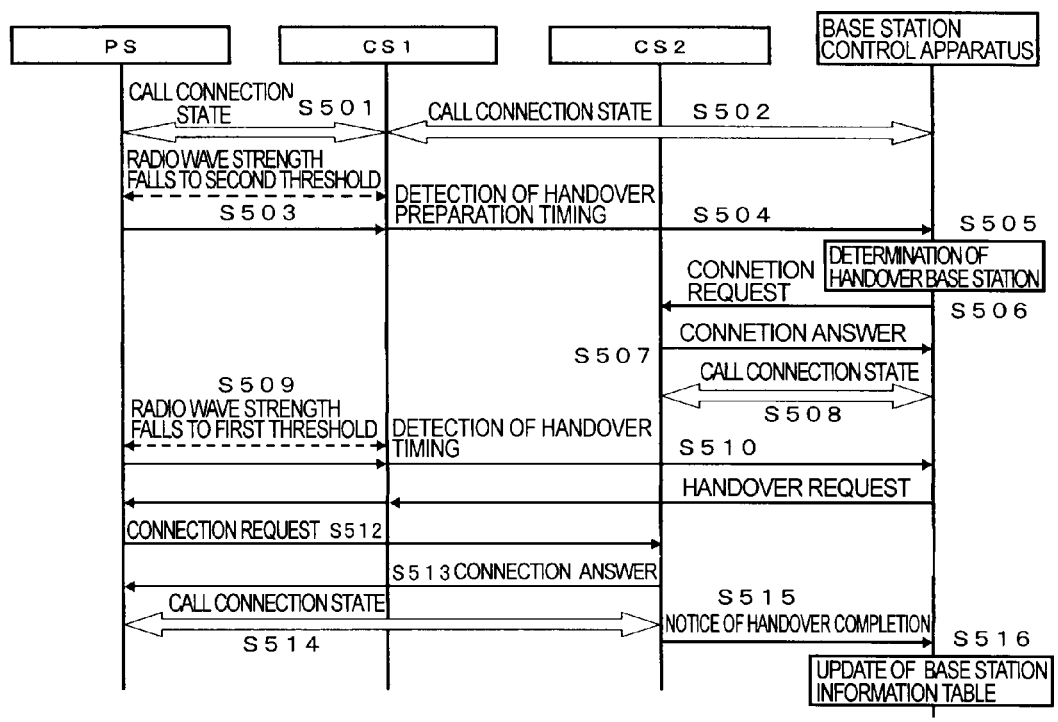
FIG. 16 illustrates a sequence diagram of the handover operation according to a fifth embodiment.

However, the mobile terminal can detect those timing. In this embodiment, mobile terminal PS detects both the handover timing and the handover preparation timing. The mobile communication system of this embodiment is explained. The whole system of the mobile communication system and the base station control apparatus are the same as those of embodiment 3, and illustration and explanation are omitted. A sequence from call connections among mobile terminal PS, base station control apparatus 1 and base station CS2 until the handover completion is shown in FIG. 16.

While a call connection between mobile terminal PS and base station CS1 is established (S501) and a call connection between base station CS1 and base station control apparatus 1 is established (S502), mobile terminal PS measures the strength of the radio wave from base station CS1 by radio wave strength measurement section 27. If the radio wave strength becomes less than second threshold 34, handover timing detecting section 28 will detects the handover preparation timing. And mobile terminal PS will transmit a notice of the detection of the handover preparation timing to base station control apparatus 1 (S504) via base station CS1. When base station control apparatus 1 receives the notice, handover control section 9 will select and determine the handover base station (S405) with reference to base station information table 10. In this embodiment, the handover base station is supposed base station CS2.

Base station control apparatus 1 sends a request which makes a call connection between base station CS2 selected as the handover base station and base station control apparatus 1 start to base station CS2 (S506). Base station CS2 sends a notice of having accepted the request to base station control apparatus 1 (S507), and a call between base station CS2 and base station control apparatus 1 is connected (S508).

If the strength of the radio wave from base station CS1 which mobile terminal PS receives becomes less than first threshold 32, mobile terminal PS detects the handover timing by handover detecting section 28. And mobile terminal PS sends a notice showing that the handover timing was detected to base station control apparatus 1 (S510). When base station control apparatus 1 receives the notice which shows that the handover timing was detected (S510), base station control apparatus 1 requires mobile terminal PS to hand over to base station CS2 (S511). Since subsequent processing is the same as processing after S412 of embodiment 4, explanation is omitted.

As mentioned above, according to this embodiment, since base station control apparatus 1 selects and determines the handover base station with reference to the base station information table, a high-speed handover becomes possible. By handover preparations, a call between the handover base station and base station control apparatus 1 has been connected beforehand when handover is performed. For this reason, as compared with the conventional technology and the systems according to embodiment 1 through embodiment 3, the handover is realizable with less procedure from the handover request to the handover operation. Furthermore, since the handover base station is determined with reference to the base station information table, a high-speed handover is possible. And a seamless handover is realizable.

Other-embodiments or modifications of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. A mobile communication system, comprising:
   a plurality of base stations that communicate with a mobile terminal; and
   a base station control apparatus connected to the base stations and including a base station information table which is created based on a handover history of the mobile terminal, the base station information table storing base station information including, for each base station connected to the base station control apparatus, a number of times of selection or a selection rate indicating how often the respective base station was selected as a handover base station, the base station control apparatus including
      a handover control section that selects, based on the base station information table, the handover base station to which the mobile terminal hands over and directs the mobile terminal to hand over to the base station selected as the handover base station; and
      a base station information management section that updates the base station information table when the mobile terminal has handed over.

2. The mobile communication system according to claim 1, wherein the handover control section selects the base station with the highest selection rate as the handover base station.

3. The mobile communication system according to claim 2, wherein the base station control apparatus further includes a base station remaining resource table storing remaining radio resources for each base station, and the handover control section selects a base station with remaining radio resources as the handover base station.

4. The mobile communication system according to claim 1, wherein the handover control section selects a base station with a largest number of times of selection as the handover base station.

5. The mobile communication system according to claim 1, further comprising a handover timing detecting section that detects a handover timing based on degradation of communication quality between the mobile terminal and a handover origin base station;
   wherein the handover control section selects the handover base station after the handover timing detecting section detects the handover timing.

6. The mobile communication system according to claim 1, further comprising a handover timing detecting section that detects both a handover timing and a handover preparation timing based on degradation of communication quality between the mobile terminal and a handover origin base station;
   wherein the handover control section selects the handover base station after the handover timing detecting section detects the handover preparation timing, and the base station control section directs to the mobile terminal to hand over to the handover base station after the handover timing detecting section detects the handover timing.

7. A mobile terminal used for the mobile communication system according to claim 1, the mobile terminal comprising:
   a receiving section that receives a notice of handover directions including information identifying the handover base station selected by the base station control apparatus to which the mobile terminal is to hand over; and
   a call connecting section that requires a call connection to the handover base station based on the information contained in the notice of the handover directions received by the receiving section.

8. A base station control apparatus connected to a plurality of base stations that communicate with a mobile terminal, the base station control apparatus comprising:
   a base station information table which is created based on a handover history of the mobile terminal and stores base station information including, for each base station connected to the base station control apparatus, a number of times of selection or a selection rate indicating how often the respective base station was selected as a handover base station;
   a handover control section that selects, based on the base station information table, the handover base station to which the mobile terminal hands over, and directs the mobile terminal to handover to the base station selected as the handover base station; and
   a base station information management section that updates the base station information table when the mobile terminal has handed over.

9. The base station control apparatus according to claim 8, wherein the handover control section selects a base station with a highest selection rate as the handover base station.

10. The base station control apparatus according to claim 8, wherein the handover control section selects a base station with a largest number of times of selection as the handover base station.

11. The base station control apparatus according to claim 8, further comprising a base station remaining resource table storing remaining radio resources for each base station,
    wherein the handover control section selects a base station with remaining resources as the handover base station.

12. A method for controlling handover for a base station control apparatus connected to a plurality of base stations to which a mobile terminal connects, the method comprising:
    managing a base station information table which is created based on a handover history of the mobile terminal and includes, for each base station connected to the base station control apparatus, a number of times of selection or a selection rate indicating how often the respective base station was selected as a handover base station selecting a base station as a handover base station to which the mobile terminal hands over among the base stations based on the base station information; and requesting the mobile terminal to hand over to the base station selected as the handover base station.

13. The method for controlling the handover according to claim 12, wherein the selecting a base station as a handover base station selects a base station with a highest selection rate as the handover base station, and the managing a base station information updates the selection rate of the base station selected as the handover base station and sorts the base station information table in order with high selection rate when the handover of the mobile terminal is completed.

14. The method for controlling handover according to claim 12, wherein the selecting a base station as a handover base station selects a base station with a largest number of times of selection as the handover base station and the managing a base station information updates the number of times of selection of the handover base station and sorts the base station information table in order with large number of times of selection when the handover of the mobile terminal is completed.

15. The method for the controlling handover according to claim 12, further comprising managing remaining radio resource for each base station using a remaining radio resource table, the managing of remaining radio resource updates a number of remaining radio resources of the remaining radio resource table when the handover of the mobile terminal is completed.

16. The method for controlling handover according to claim 15, wherein the managing of remaining radio resource adds the information on the handover base station to the base station information table when the handover of the mobile terminal is completed and the handover base station is not described in the base station information table.

* * * * *